United States Patent
Olafsson et al.

[11] Patent Number: 5,970,100
[45] Date of Patent: Oct. 19, 1999

[54] SYSTEM FOR CONTROLLING AND SHAPING THE SPECTRUM AND REDUNDANCY OF SIGNAL-POINT LIMITED TRANSMISSION

[75] Inventors: Sverrir Olafsson, Reykjavik, Iceland; Zhenyu Zhou, Irvine; Xuming Zhang, Mission Viejo, both of Calif.

[73] Assignee: Conexant Systems, Inc., Newport Beach, Calif.

[21] Appl. No.: 09/047,802

[22] Filed: Mar. 25, 1998

Related U.S. Application Data

[63] Continuation-in-part of application No. 08/756,383, Nov. 27, 1996, which is a continuation-in-part of application No. 08/746,731, Nov. 15, 1996.

[51] Int. Cl.⁶ .................................................. H04L 25/06
[52] U.S. Cl. ............................................................ 375/296
[58] Field of Search .................................. 375/253, 254, 375/222, 242, 285, 295, 296; 341/55, 59; 379/93.01

[56] References Cited

U.S. PATENT DOCUMENTS

| | | | |
|---|---|---|---|
| 4,071,692 | 1/1978 | Weir et al. | 375/242 |
| 4,387,364 | 6/1983 | Shirota | 341/55 |
| 4,486,739 | 12/1984 | Franaszek et al. | 341/59 |
| 5,249,200 | 9/1993 | Chen et al. | 375/285 |
| 5,388,092 | 2/1995 | Koyama et al. | 370/289 |
| 5,450,443 | 9/1995 | Siegel et al. | 375/286 |
| 5,528,625 | 6/1996 | Ayanoglu et al. | 375/222 |
| 5,644,601 | 7/1997 | Kawaguchi | 375/295 |
| 5,754,587 | 5/1998 | Kawaguchi | 375/296 |
| 5,825,816 | 10/1998 | Cole et al. | 375/222 |

FOREIGN PATENT DOCUMENTS

WO98/39883  9/1998  WIPO .

OTHER PUBLICATIONS

"A Comparison of CSS and Maximum Inversion", Vedat Eyuboglu, Telecommunications Industry Association (TIA) Oct. 14–16, 1997.

"Lookahead Frames for Spectral Shaping", Bahman Barazesh, ITU—Telecommunications Standardization Sector, Dec. 3–5, 1997.

"DC Suppresser for PCM Modems", RCA Communications, Telecommunications Industry Association (TIA) Nov. 13–15, 1996.

"A Spectral Shaping Technique for PCM Modems", Vedat Eyuboglu, Telecommunications Industry Association (TIA), Nov. 13–15, 1996.

Primary Examiner—Tesfaldet Bocure
Attorney, Agent, or Firm—Snell & Wilmer L.L.P.

[57] ABSTRACT

Methods and apparatus are disclosed for shaping and controlling the spectrum of transmitted samples with a set of predetermined frequency characteristics and a predetermined set of allowable transmitted signal levels are disclosed. In particular, methods of minimizing the energy of the signal at unwanted frequencies are described. For each of the transmitted samples, the system computes a running measure of unwanted components. It then computes, for each block (or "data frame") of the transmitted samples, an objective function, for example, a running filter sum based upon a biquad filter function. It then selects, for each block or spectral shaping frame of transmitted samples, a sign combination from a sign-combination subset such that the objective function is optimized.

36 Claims, 9 Drawing Sheets

SYSTEM FOR CONTROLLING AND SHAPING THE SPECTRUM AND REDUNDANCY OF SIGNAL-POINT LIMITED TRANSMISSION

CROSS-REFERENCE TO RELATED APPLICATIONS

The present application is a continuation-in-part of application Ser. No. 08/756,383, filed Nov. 27, 1996, which is a continuation-in-part of application Ser. No. 08/746,731, filed Nov. 15, 1996. The disclosures of both applications are incorporated herein by reference.

BACKGROUND OF THE INVENTION

The present invention relates to transmission of digital information over an analog medium connected to a digital network and more particularly to Pulse Code Modulation (PCM) modems.

The world based on the Internet has seen tremendous growth in recent months. As more users begin browsing and downloading information from the World Wide Web, there has been a great desire to increase the data transmission rate, or simply called data rate. The desire is even greater for users accessing the Internet through an Internet service provider (ISP), since most users are linked up to the "Net" through a personal computer and a modem. Conventional analog modems, such as V.34 modems, however, view the public switched telephone network ("PSTN") as an analog channel, even though the signals are digitized for communications throughout most of the PSTN. As such, various effects of and impairments due to signal quantization impose a limitation on the data rate of the channel to about 35 Kbps. This limit has been commonly known as Shannon's Limit. (See C. E. Shannon and W. Weaver, *The Mathematical Theory of Communication*, University of Illinois Press, 1949).

There has been much recent development of high-speed communications technology based on PCM modems, where data rates of at least 56 Kbps are said to be actually attainable. The PCM modem technology is based on the simple realization that the PSTN is increasingly a digital network and not an analog network. Also, more and more central site modems are connected to the PSTN through digital connections, i.e., T1 in the U.S. and E1 in Europe, without requiring a CODEC (coder/decoder). A CODEC is a device which connects the digital portion of the network to the analog local loop and converts between analog and digital.

The conventional modem, however, still interprets this digital stream as the representation of the modem's analog signal. With the PCM modems, however, a much higher data rate can be achieved without the complicated task of re-wiring the user's site or modifying the telephone network. It should be recognized that "central site" modems refer to those modems installed at an ISP, or at a corporation, for example, to allow many simultaneous connections for remote local area network (LAN) access.

The recent 56 Kbps technology seeks to address an impaired section of the communications path of the PSTN digital network, where the impairment is due to the hybrid and the copper wire interface between the telephone central office and the user's home, usually referred to as the analog local loop.

Since recently, much has been described about PCM modems and how they can and should facilitate downstream data communication at a much higher rate than the present paradigm. For example, the PCM modem has been the subject of a recent Telecommunications Industry Association (TIA) Technical Committee TR-30 Standards meeting on Oct. 16-17, 1996. The submitted technical contributions include Guozhu Long's *DC Suppresser for 56K Modems*, David C. Rife's *56 Kbps Channels*, Veda Krishnan's *V.pcm Modem Standard*, Vedat Eyuboglu's *PCM Modems: A Technical Overview*, Richard Stuart's *Proposal for a High Speed Network Access Modem*, and Vladimir Parizhsky's *U.S. Robotics' x2 Technology: Technical Brief*. These contributions are hereby incorporated by reference.

Also, there have been recent publications on the overall data communication system based on the PCM modem. The first one is a 1995 presentation disclosed by Pierre A. Humblet and Markos G. Troulis at Institute Eurecom, entitled *The Information Driveway*, 1995, which purports to explain the basic concepts on the high speed modem. The second one is a PCT Patent Publication, dated Jun. 13, 1996, International Publication Number WO/9618261, by Brent Townshend, which discloses a High Speed Communications Systems for Analog Subscriber Connections. This Publication, on pages 17–19, discloses an overall high speed system based on PCM modems, which also implements DC null elimination on the transmitter side. These papers provide a fair reference to the basics of the high speed PCM modems and their environment, and are hereby incorporated by reference.

Additionally, U.S. Pat. No. 5,528,625, issued to Ender Ayanoglu of AT&T, dated Jun. 18, 1996, entitled High Speed Quantization-Level-Sampling Modem With Equalization Arrangement, discloses a QLS modem for high-speed data communication. Another U.S. patent also issued to Ender Ayanoglu of AT&T, U.S. Pat. No. 5,394,437, dated Feb. 28, 1995, entitled High-Speed Modem Synchronized To A Remote CODEC, discloses a high-speed modem for data transmission over an analog medium in tandem with a digital network. These references are also hereby incorporated by reference.

FIG. 1 depicts a conceptual diagram of the typical high-speed communication path using PCM modem technology. An ISP, or central site, 100 is digitally connected to a telephone network 130 through its transmitter 110 and receiver 120. The network 130 is connected to a local loop 150 through a central office line card 140. The line card typically has a PCM CODEC implemented therein. The local loop 150 is connected to the user's PC at the user's site through the user's modem 160. As can be appreciated by those skilled in the art, the connection between the ISP modem transmitter 110 to the telephone network 130 is a digital connection with a typical data rate of about 64 Kbps. Since the parameters of the telephone network 130 and line card 140 are dictated and set by the telephone company's specifications and operation, the central site transmitter 110 needs to transmit the digital data in a particular way to fully exploit its digital connection to the network. However, dealing with the central site transmitter in this new paradigm has some obstacles.

In this type of data communication systems, such as that including the transmitter 110 in the central site, the transmit signal points are determined by physical constraints, and cannot be made part of the overall transmitter design. An example is when a signal is transmitted from within the digital part of the telephone network to the residential customer. That system will be the focus of the following description, although the methods described hereinafter will in many cases be applicable to other systems.

The transmitter 110 sends 64 Kbps of data into the network 130, which is eventually translated to an analog signal in a digital-to-analog converter in the central office line-card CODEC 140. To send the maximum of 64 Kbps of data, all transmitted bits must be determined by the incoming data. Any modification of the outgoing sequence of bits resulting in correlation between the bits represents redundancy in the signal, and will thus result in a lower data rate. Therefore, if the analog signal is to be controlled in any way, the data rate must be lowered. The main task confronting designers, then, is to perform the desired control with the least amount of redundancy added.

Impairments Presented by the Communication Channel

There are other difficulties from the channel which affect the implementation of the PCM modem and the information transmission. The communication channel from the line card PCM CODEC to the user's modem can be characterized by four primary functional units: the CODEC's anti-aliasing filter, the line card circuit, the subscriber loop and the modem's input circuit.

First, the CODEC anti-aliasing filter is mostly flat, and starts to attenuate the signal at about 3.5 kHz, increasing to 15–20 dB at 4 kHz.

Second, the line card circuit is in some ways the most challenging impairment. It is difficult to characterize, since there are many types in use, and it has been designed to transmit a voice signal rather than a data signal. The hybrid transformer circuit includes a null at 0 Hz, and may induce high levels of nonlinear distortion, especially on signals with low-frequency energy.

Third, the subscriber loop itself is generally a linear impairment, creating inter-symbol interference (ISI) and picking up largely Gaussian noise. Non-Gaussian noise sources are near-end crosstalk ("NEXT"), far-end crosstalk ("FEXT") and single frequency interference (SFI). The prime source of SFI is the electricity distribution network, adding a 50 or 60 Hz tone to the signal.

Finally, the modem input circuit consists of a line interface, including a hybrid transformer, and an analog-to-digital converter (ADC). The hybrid introduces a null in the spectrum at 0 Hz, and may also induce nonlinearities. However, since the signal level at the modem end is lower than at the central office, and the transformer can be part of the receiver design, nonlinear distortion in the modem input circuit will generally be minimal compared to that added by the central office line card. While the ADC will of course add quantization noise, which can be made negligible by design, many ADCs will add Gaussian-type noise, often with a "1/f" spectral characteristic, i.e., with highest energy at the low-frequency end of the spectrum. Also, a DC offset can be expected in the ADC, requiring some compensation by the receiver.

Given these impairments, it might seem difficult to take advantage of the low-end of the spectrum. The two transformer hybrids introduce nulls at 0 Hz, SFI is mostly around 50–60 Hz, and nonlinear distortion is increased if energy is transmitted at low frequencies (and will extend into higher frequencies). ADC noise also tends to be most prevalent at low frequencies.

Thus, it is desirable to simplify the receiver design by having the transmitter avoid sending energy at low frequencies. Without the low frequency energy, the receiver may elect to simply implement a high-pass filter to filter out noise without the need to reconstruct the signal component removed.

In the following disclosure of the present invention, methods will be disclosed for controlling the sequence of bits transmitted to the line card CODEC to eliminate as much energy as possible at low frequencies. For illustration purposes, the following disclosure will assume a redundancy of 4 Kbps, where 4 Kbps out of the 64 Kbps are generated based on the other bits. Generally, a higher redundancy may improve the performance, and the methods disclosed herein can readily be modified for a different level of redundancy.

BRIEF SUMMARY OF THE INVENTION

A method and apparatus for shaping and controlling the spectrum of transmitted is samples with a set of predetermined frequency characteristics and a predetermined set of allowable transmitted signal levels are disclosed. As will be described below, methods and apparatus for controlling the spectrum of the line CODECs output signal are disclosed. In particular, methods of minimizing the energy of the signal at unwanted frequencies are described. These methods can be readily extended to other parts of the spectrum by those skilled in the art based on the teaching of the present invention.

More particularly, the method first calculates, for each of the transmitted samples, a running measure of unwanted components up to the current sample. It then computes, for each block (or "data frame") of the transmitted samples, an objective function based on the running measure previously calculated. It then selects, for each block of the transmitted samples, at least one redundant sample to be added, or at least one transmitted sample to be modified, at structured or randomized locations within the block of samples to optimize the objective function. The location of the dependent sample can further be fixed, scrambled (pseudo-random) or randomized. The method of computing can be any one of the following: a Running Filter Sum, a Running Fourier Transform ("RFT") or Fast FT ("RFFT"), or an RDS, among other methods of computation, for each transmitted sample.

BRIEF DESCRIPTION OF THE DRAWINGS

Additional objects, advantages and features of the present invention will be disclosed in the following description, wherein.

DETAILED DESCRIPTION OF THE INVENTION

Methods and apparatus for spectrum control and shaping in signal-point limited transmission systems are disclosed. In the following description, various aspects of the present invention are presented in terms of process flows, functional block diagrams and even mathematical expressions, which are the ways those skilled in the art communicate with each other in conveying their ideas and designs.

Figure 1:
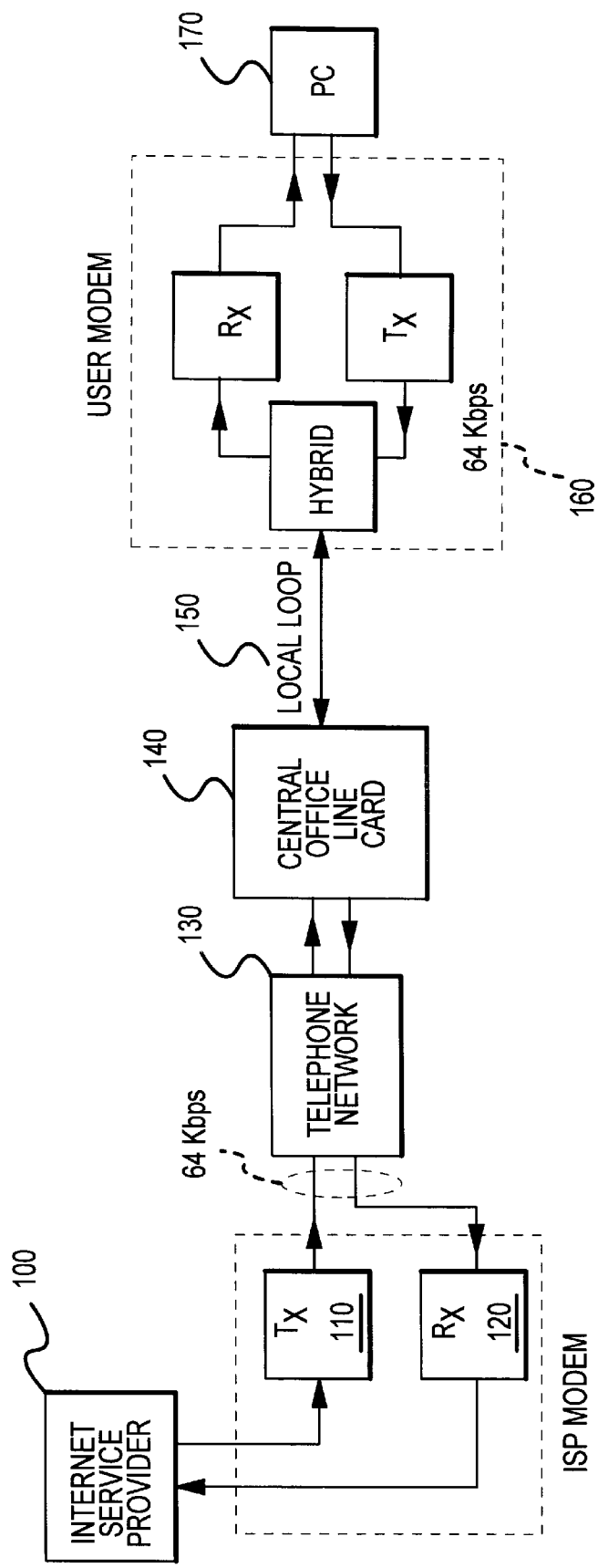
FIG. 1 depicts a conceptual diagram of the high-speed communication path using the PCM modem technology.
Figure 2:
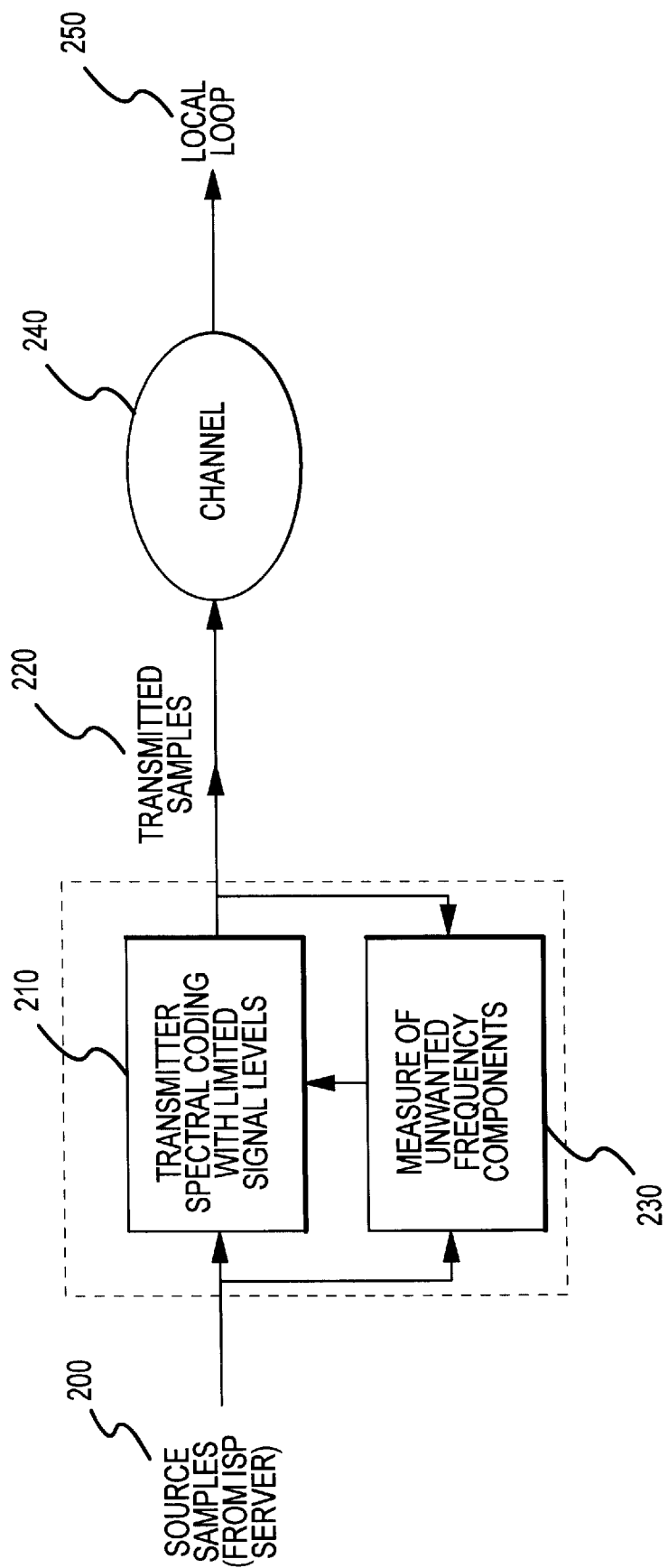
FIG. 2 illustrates a block diagram of the preferred environment of the spectrum control and shaping in accordance with one aspect of the present invention.

FIG. 2 illustrates a block diagram showing one environment where the spectral shaping in accordance with one aspect of the present invention is applicable. Source samples 200 from a data source, such as the ISP's server, are transmitted by a transmitter 210 (of an ISP modem) to generate transmitted samples 220. The transmitted samples 220 are transmitted through a channel 240 to the local loop and eventually the user 250.

Those skilled in the art will recognize that the channel 240 is PCM-based with a limited set, i.e., 255 in $\mu$-law or A-law, of signal levels, since it is specified by the telephone networks. Those skilled in the art will also appreciate that the transmitter 210 must be one using lossless coding such that no information is lost between source samples 200 and transmitted samples 220. To avoid sending the low-frequency energy to the channel 240, the low-frequency component must be eliminated (230) as the source samples 200 are coded by the transmitter 210 based on a set of characteristics of the frequency spectrum. In other words, the running digital sum ("RDS") of any block of source samples must be minimized, which means that the low frequency energy is partially offset or entirely eliminated. Also, there must be redundancy added to ensure a lossless coding by the transmitter.

The conventional way of making RDS bounded is to use an Alternate Marking Input ("AMI") method, which generates additional, but opposite, voltage levels for the samples to bring the RDS to within a symbol size. The AMI, however, is unacceptable for PCM channels, since there is a fixed set of signal points, or voltage levels for the PCM channel as dictated by the telephone networks.

Figure 3:
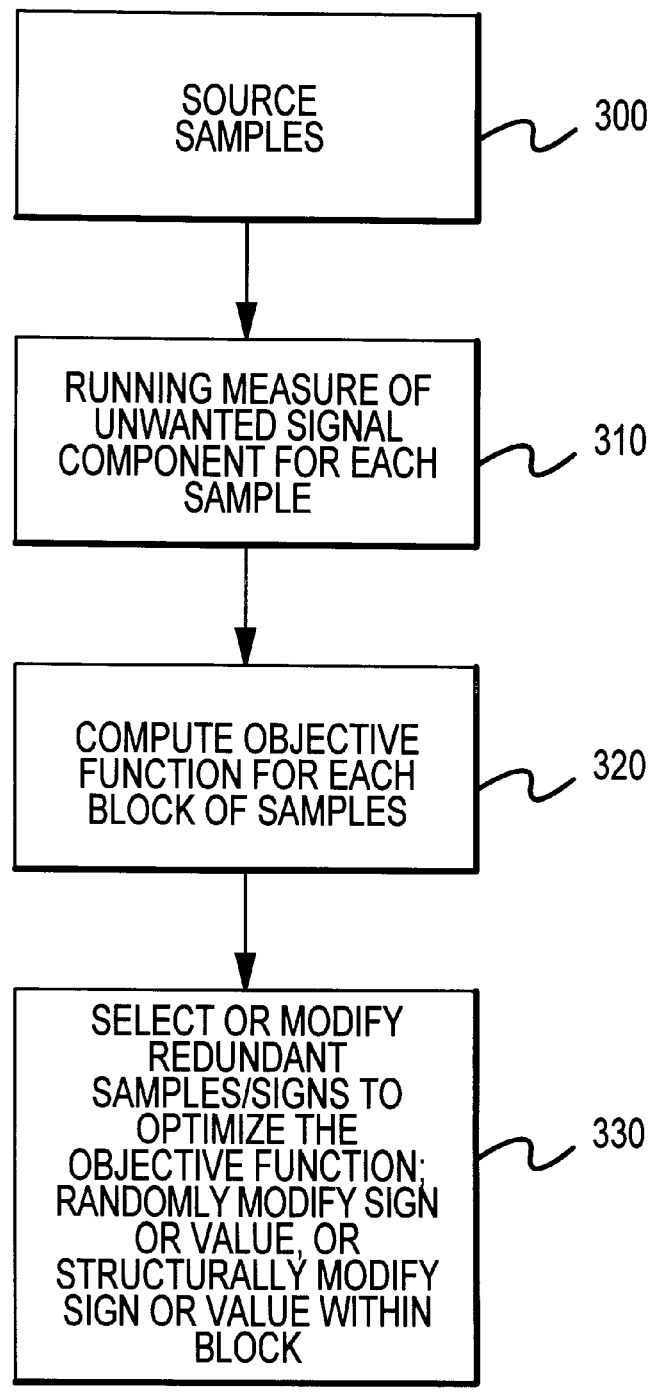
FIG. 3 illustrates a generalized process flow of lossless spectrum shaping and control in accordance with the present invention.

Referring to FIG. 3, a generalized process flow of the spectral shaping methodology in accordance with one aspect of the present invention is shown. First, a block of source samples 300 is applied to the transmitter for coding based on a set of predetermined characteristics of the transmit frequency spectrum. For each sample, a predetermined component is measured (310).

Broadly, the measure of the unwanted signal components of the transmitted samples up to the current sample can be accomplished using a Running Filter Sum (RFS). If the corresponding filter coefficients are selected to be a Fourier basis function, then the measure becomes Running Discrete Fourier Transform (RDFT) or Running Fast Fourier Transform (RFFT). It is more convenient to use RDFT or RFFT to form a set of frequency null. If only DC is of concern, then the measure reduces to RDS.

For every block of a predetermined number of transmitted samples, an objective function is computed (320) based on the measure already obtained. Note that the objective functions may be computed using any one of the following well-known techniques:

a) L−2 Norm of the measurement;

b) L−1 Norm of the measurement;

c) L−$\alpha$ Norm (for 1<$\alpha$<2);

d) a weighted version of L−2 Norm;

e) a weighted version of L−1 Norm;

f) a weighted version of L−$\alpha$ Norm (for 1<$\alpha$<2).

Finally, for every block of source samples, at least one redundant sample is added or at least one source sample is modified (330), e.g., the sign of the sample is modified, such that it will optimize the objective function. When the objective function is optimized, the unwanted signal component is minimized, e.g., the energy of the unwanted signal component is minimized.

It should be noted that the source samples are not intended to be limited to real values. However, for illustration purposes in the disclosure, only real numbers are considered.

It should be apparent to those skilled in the art that when applied to the energy at 0 Hz, the methodology will minimize the unwanted DC component in the transmitted samples. As can be appreciated by those skilled in the art, the system will provide arbitrary spectral-shaping, or coding, of the transmitted samples, whatever the characteristics of the transmit spectrum require.

The following description will first disclose the present invention in the context of spectral shaping in a simple DC null, followed by spectral shaping in multiple frequency nulls and then, eventually, spectral pre-coding based on a predetermined spectrum shape. For the purposes of illustration in the following description, transmitted samples can be classified as source samples and dependent samples, where the source samples are unmodified and the dependent samples are either redundant samples or modified source samples, e.g., sign-modified, or both. In all measures described herein, the location of the dependent sample can be anywhere in the block, structurally (including pseudo-randomized) or randomly. If randomly located, the location index must be transparent to the receiver, i.e., encoded into the transmitter sequence. That is, it may be desirable to encode the location of the redundant sign implicitly in accordance with suitable indicia of the block contents, such as the magnitude of the mapped amplitudes. For example, the redundant sign may be encoded in the largest symbol, where the symbol occurring first is chosen in the case where two or more symbols have the greatest amplitude.

For simplicity of the description below, we assume the locations of the dependent samples remain the same for all the blocks. Those skilled in the art can readily adapt the present invention for those scrambled locations based on the teaching of the present invention.

A. A Simple DC Null

In accordance with the present invention, the effect of the DC nulls of the transformer hybrids at the PCM CODEC can be avoided by creating a DC-null in the transmit spectrum.

1) Redundant Sample

This can be done by letting every $L^{th}$, e.g., L=16, sample counteract the DC introduced by previous samples.

Given the output signal $x_n$, let us define a DC measurement $c_n$, $$c_n = \sum_{m=0}^{n} x_m.$$

Figure 4:
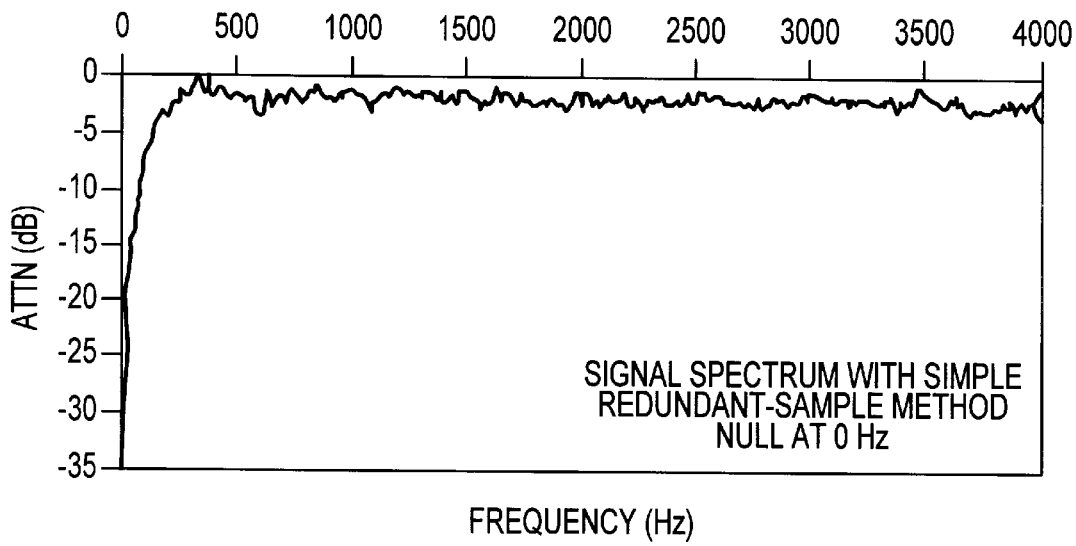
FIG. 4 illustrates the signal spectrum with simple redundant-sample method, where the null is at 0 Hz.

This is commonly known as the RDS approach. If, when n is a multiple of L, we let $x_n = Q(-c_{n-1})$, where $Q(.)$ quantizes its input to the closest value in the PCM DAC, the DC component of the signal will be greatly attenuated, in that:

$$x_n = \begin{cases} M(d_n) & \text{if } n \neq Lr \\ Q(-c_{n-1}) & \text{if } n = Lr \end{cases}, r \text{ is a non-negative integer,}$$

where M is a suitable mapping function from data to a subset of the PCM quantization values. FIG. 4 illustrates the signal spectrum using simple redundant-sample method, where the null is at 0 Hz.

2) Redundant Sign

Another method to create a DC null is to modify the sign of every L, e.g., L=2, sample based on $c_{n-1}$, then, $$x_n = \begin{cases} M(d_n) & \text{if } n \neq Lr \\ sgn(-c_{n-1})M'(d_n) & \text{if } n = Lr \end{cases}, r \text{ is a non-negative integer,}$$

where M' only selects positive quantization values. Clearly, $d_n$ should preferably have one less bit when n=L k.

Figure 5:
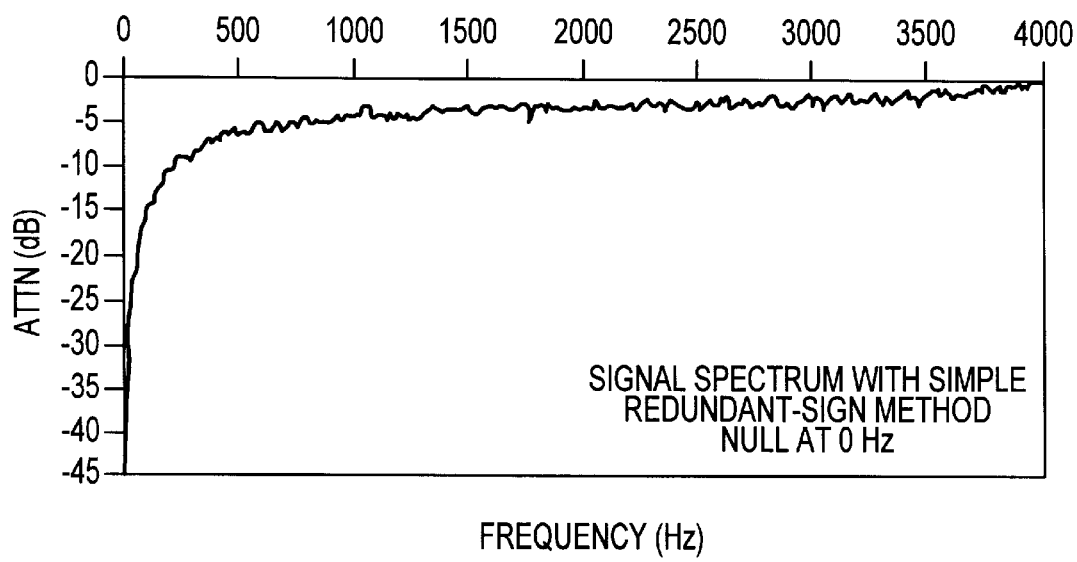
FIG. 5 illustrates the signal spectrum with simple redundant-sign method, where the null is at 0 Hz.

FIG. 5 illustrates the signal spectrum with simple redundant-sign method, where the null is at 0 Hz.

As can be observed from FIGS. 4 and 5, both methods create a DC-null in the transmit spectrum without much effect on the spectrum above 100 Hz. The receiver will not have to reconstruct the signal component at DC, thus greatly simplifying the receiver circuit.

B. Creating Nulls at Individual Frequencies

1) Single Frequencies

The above-described methods can be generalized, or extended, to insert nulls (or rather, near-nulls) at any frequencies. Let us define $c_n^{(k)}$ (now a complex number) as, $$c_n^{(k)} = \sum_{m=0}^{n} x_m e^{-j\omega_k m},$$

where $\omega_k$ represents the frequency $f_k = \omega_k / 2\pi T$ with symbol period T. If we make every $L^{th}$, e.g., L=16, sample dependent, then we select the dependent samples to minimize $|C_n^{(k)}|^2$. It should be noted that L is not restricted to 16 in any sense and those skilled in the art can readily apply a different value in accordance with their special applications. It can readily be shown that the best selection for $x_n$ is then, $$x_n = Q(-\text{Re}[c_{n-1}^{(k)} e^{j\omega_k n}]).$$

It is then possible to have a generalization for the DC-null redundant-sample method as:

$$x_n = \begin{cases} M(d_n) & \text{if } n \neq Lk \\ Q(-\text{Re}[c_{n-1}^{(k)} e^{j\omega_k n}]) & \text{if } n = Lk \end{cases}, \text{e.g., } L = 16.$$

Figure 6:
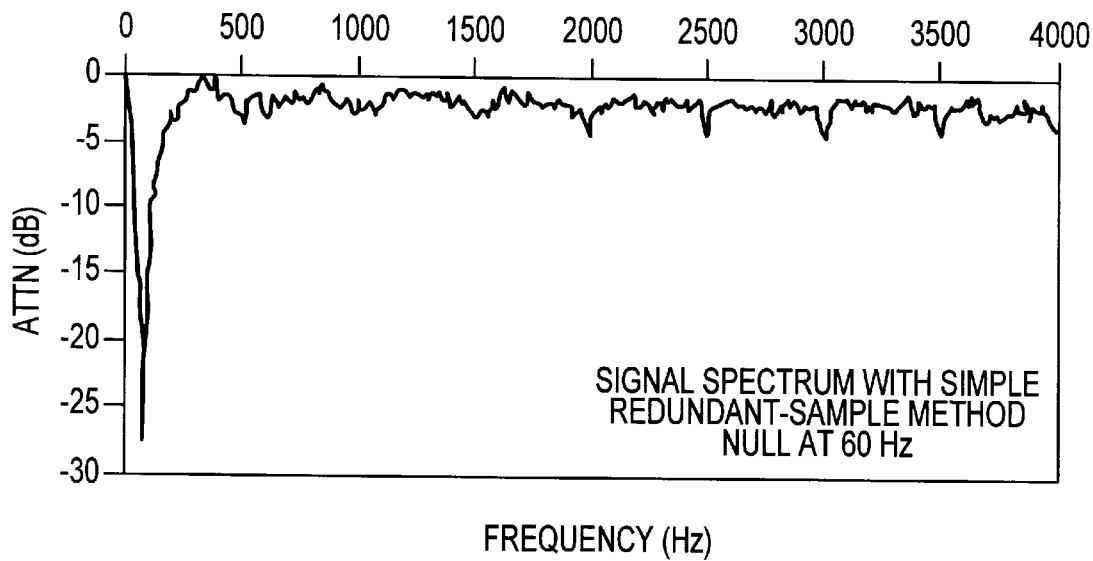
FIG. 6 illustrates the signal spectrum with simple redundant-sample method, where the null is now at 60 Hz.

FIG. 6 illustrates the signal spectrum with simple redundant-sample method, where the null is now at 60 Hz.

A generalization for the DC-null redundant-sign method is now, $$x_n = \begin{cases} M(d_n) & \text{if } n \neq Lr \\ sgn(-\text{Re}[c_{n-1}^{(k)} e^{j\omega_k n}])M'(d_n) & \text{if } n = Lr \end{cases}, \text{e.g., } L = 2.$$

Figure 7:
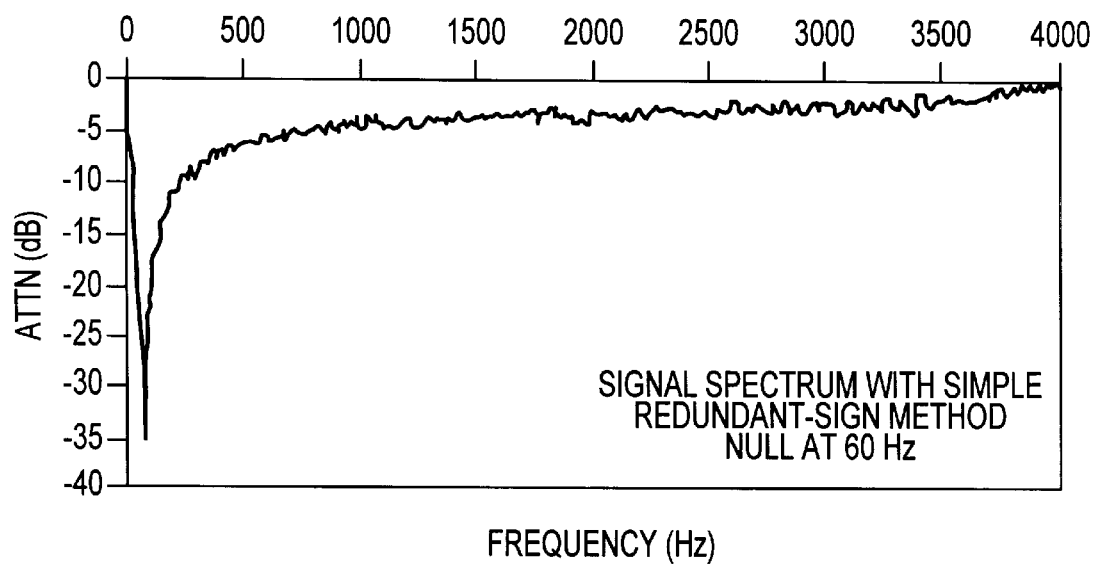
FIG. 7 illustrates the signal spectrum with simple redundant-sign method, where the null is at 60 Hz.

FIG. 7 illustrates the signal spectrum with simple redundant-sign method, where the null is at 60 Hz. As can be observed by those skilled in the art, if $\omega_k = 0$, this becomes the same as the special case with the DC null.

2) Multiple Frequencies

The generalized method as described above can in fact be done at more than one frequency. If we define a set of $\omega_k, k=0,1,\ldots,K-1$, and minimize the sum of the squared norms of $c_n^{(k)}$, it can be found that the best selection for $x_n$ for the redundant sample method is, $$x_n = \begin{cases} M(d_n) & \text{if } n \neq Lr \\ Q(-C_n) & \text{if } n = Lr \end{cases},$$

where $$C_n = \frac{1}{K}\sum_{k=0}^{K-1} \text{Re}[c_{n-1}^{(k)} e^{j\omega_k n}],$$

and for the redundant sign method, $$x_n = \begin{cases} M(d_n) & \text{if } n \neq Lr \\ sgn(-C_n)M'(d_n) & \text{if } n = Lr \end{cases}.$$

If the goal is to suppress a band of frequencies, then those skilled in the art can readily replace summation ($\Sigma$) with integration ($\int$) in calculating $C_n$.

Figure 8:
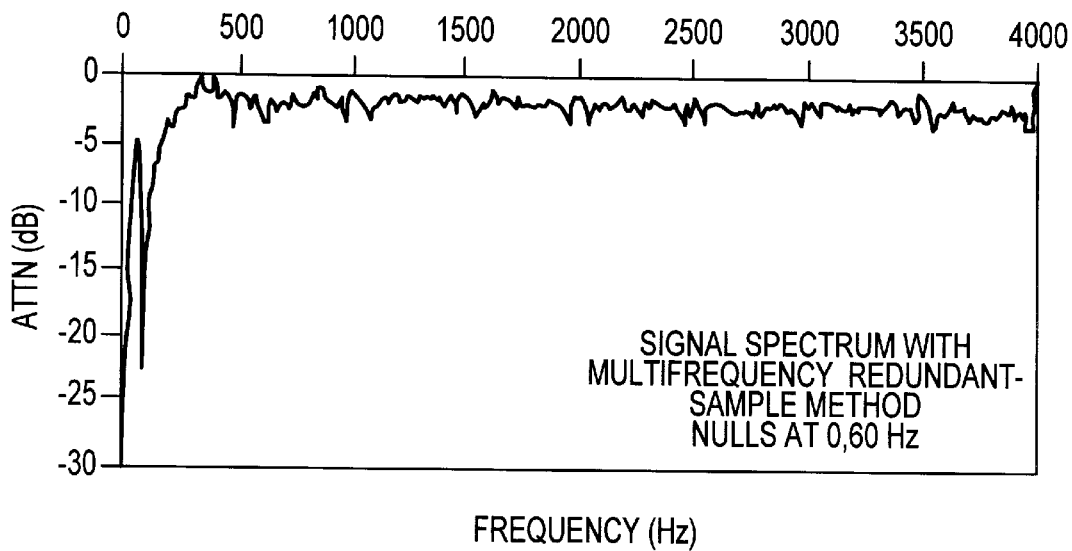
FIGS. 8 and 9 illustrate the signal spectrum with multiple frequency redundant-sample and multiple frequency redundant-sign methods, respectively, with nulls at 0 Hz and 60 Hz.
Figure 9:
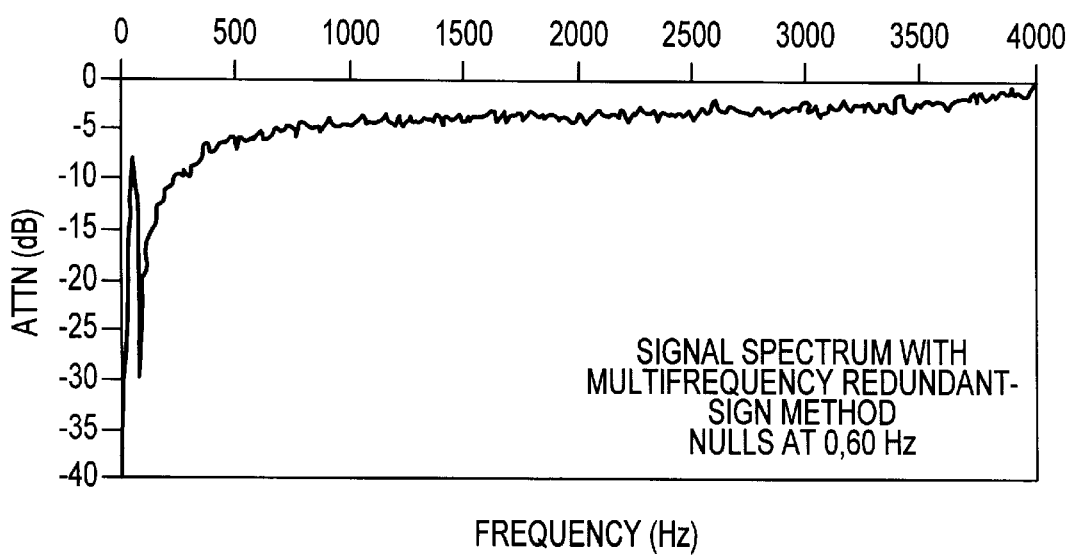

FIGS. 8 and 9 illustrate the signal spectrum with multiple frequency redundant-sample and multiple frequency redundant-sign methods, respectively, with nulls at 0 Hz and 60 Hz.

C. Block Coding of Redundant Samples

The performance of the above-described redundant-sample method can be further enhanced by considering blocks of data and jointly optimizing several redundant samples. It should be appreciated that in the context of this application the terms "block" and "data frame" are used interchangeably to indicate sets of transmitted samples.

If we make every $L^{th}$, e.g., L=16, sample redundant, then we can consider jointly optimizing N redundant samples in a super block of (N×16) samples. That is, $x_n, x_{n-16}, \ldots, x_{n-(N-1)*16}$ are selected simultaneously to minimize the sum of squared norms of $c_n^{(k)}$. It will be appreciated by those skilled in the art that the N jointly optimized redundant samples $x_n, x_{n-16}, \ldots, x_{n-(N-1)*16}$, without quantization, are roots of the following linear equation: A x=b, where $$A = \begin{Bmatrix} K & \sum_{k=0}^{K-1}\cos(16w_k) & \cdots & \sum_{k=0}^{K-1}\cos(16(N-1)w_k) \\ \sum_{k=0}^{K-1}\cos(16w_k) & K & \cdots & \vdots \\ \vdots & \vdots & \ddots & \sum_{k=0}^{K-1}\cos(16w_k) \\ \sum_{k=0}^{K-1}\cos(16(N-1)w_k) & \cdots & \sum_{k=0}^{K-1}\cos(16w_k) & K \end{Bmatrix}$$

$$x = \begin{Bmatrix} x_n \\ x_{n-16} \\ \vdots \\ x_{n-16(N-1)} \end{Bmatrix}$$

$$b = -\begin{Bmatrix} \sum_{k=0}^{K-1}\text{Re}[c_{n-1}^{(k)} e^{jw_k n}] \\ \sum_{k=0}^{K-1}\text{Re}[c_{n-1}^{(k)} e^{jw_k(n-16)}] \\ \vdots \\ \sum_{k=0}^{K-1}\text{Re}[c_{n-1}^{(k)} e^{jw_k(n-(N-1)16)}] \end{Bmatrix}$$

Here the term $c_{n-1}^{(k)}$ is $$c_{n-1}^{(k)} = \sum_{\substack{m=0 \\ m \neq n-16, n-32, \\ \cdots n-16(N-1)}}^{n-1} x_m e^{-jw_k m},$$

which is slightly different from before.

When each entry of x can only take a value from a finite set of quantization values, the exact solution of x will be replaced by its quantized version. A simple way to get a quantized version of roots of the above linear equation is to independently quantize each of the entries. A more preferred way is to jointly quantize the whole vector by searching through a small neighborhood of x and finding the quantized candidate vector which minimizes the sum of the squared norms of $c_n^{(k)}$.

It should readily be appreciated by those skilled in the art that using FFT to perform coding of redundant samples is a nominal extension of the above-described methodology. In that case, $$c_n^{(k)} = \sum_{m=0}^{n} x_m e^{-jw_k m}$$

will be replaced by $$c_P^{(k)} = \sum_{m=0}^{P-1} x_m e^{-j\frac{2\pi k}{P}m},$$

where $c_p^{(k)}$ corresponds to the FFT at the actual frequency of $f_k = k/PT$.

D. Block Coding of Redundant Signs

The Redundant Sign method, described above, can be further improved by considering blocks of data. Several signs within the block can be selected in combination to optimize. For example, if we consider a block of 4 samples and first select positive quantization points for each sample based on the input data, assuming a redundancy of 1/16, we then need to encode 2 more bits for the block, and have 2 degrees of freedom. We now want to select the set of 4 signs $S_n=(s_n,s_{n+1},s_{n+2},s_{n+3})$ to minimize the energy at the selected frequencies $f_k$, given $x'_{n+l}=M'(d_{n+l})$, l=0,1,2,3 and $c_{n-1}^{(k)}$, k=0,1, ... , K−1.

In effect, we want to direct the vector $X'_n=(x'_n,x'_{n+1},x'_{+2},x'_{n+3})$ in such a way as to minimize $C_n$. We are restricted by 2 bits, but the other 2 bits can be selected. Suppose the set of possible $S_n$ is divided into 4 subsets $A_i$, i=0, 1, 2, 3, and a subset is selected based on the input bits, $S_n$ is selected out of the four subset members to minimize $C_n$. Then we would want the elements of each subset to be as different from each other as possible, in order to handle a variety of different $X_n$ well.

One way to spread the $S_n$ is to construct a binary code, where each subset has members with maximum distance (e.g., maximum "Hamming Distance") between them, and the subsets are co-sets of each other. One example would be:

$A_0$=(0000,0011,1100,1111)
$A_1$=(0001,0010,1101,1110)
$A_2$=(0100,0111,1000,1011)
$A_3$=(0101,0110,1001,1010), where the binary code represent the sign combinations where a "0" represents "+", and a "1" represents "−" of the codeword. Here, the 2 data bits would select one of the 4 subsets, and then the sign combinations in each sign-combination subset (or a predetermined number of sign combinations, e.g., two combinations) would be tested to find which one gave the lowest $C_n$.

As mentioned briefly above, it is desirable that the sign combinations in a subset are sufficiently different from each other, i.e., that they at least differ by more than one sign bit. This may be ensured, for example, by constraining the spectral shaper to particular sign inversion rules in accordance with a trellis diagram of allowable rule sequences. For example, it is possible to employ a scheme comprising four rules: a) do nothing; b) invert all sign bits; c) invert even number sign bits, and d) invert odd-numbered sign bits, wherein the spectral shaper is constrained to choosing from two of the four rules in any particular state.

The sign combination could then be used to multiply the positive input samples. In the receiver, the decoding operation would identify the signs. The receiver would then find to which subset the sign combination belonged, and output the 2 bits corresponding to that subset. Thus, given a set of input data bits, a first subgroup of bits is used to select amplitude levels, and a second subgroup is used to select the desired sign combination.

As can be observed by those skilled in the art, an interesting side-benefit is that for each subset, the negative of each member of the subset is also in the subset. Thus, if the signal gets multiplied by −1 in the channel, the resulting subset sequence is unchanged. Therefore, no differential encoding/decoding is necessary since the coding system is sign-invariant.

Figure 10:
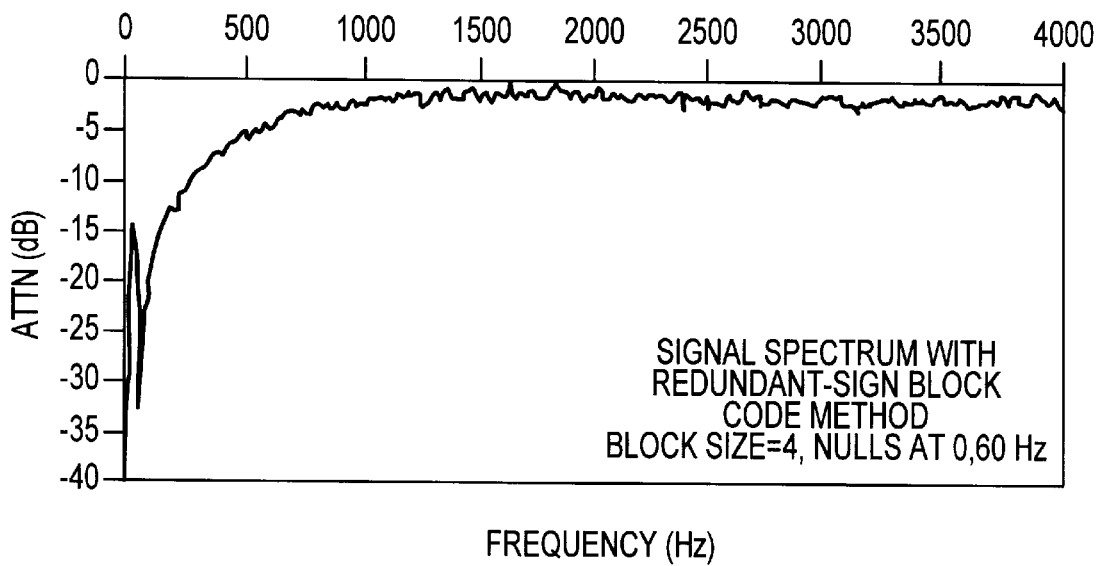
FIGS. 10 and 11 illustrate the signal spectrums with redundant-sign block code method, where block size is 4 and nulls at 0, 60 Hz and 0, 30, 60 Hz, respectively.
Figure 11:
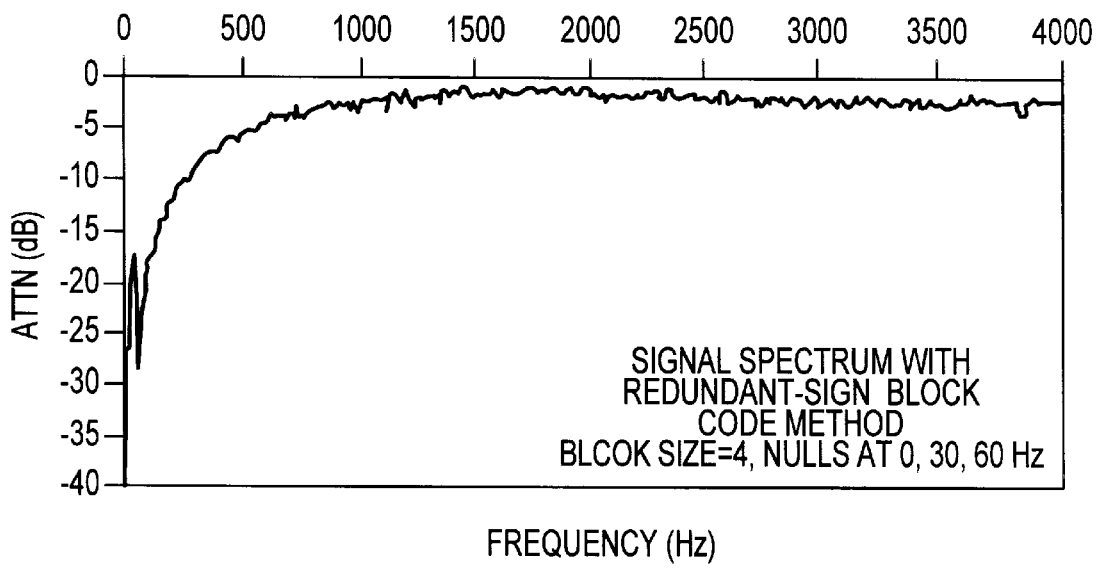

FIGS. 10 and 11 illustrate the signal spectrums with redundant-sign block code method, where the block size is 4, with nulls at 0, 60 Hz and 0, 30, 60 Hz, respectively. As can be expected, the larger the subset, the better the performance. One example of a subset structure for a block length of 8, where one still assumes a redundancy of 1/16, is illustrated in Table 1 (using hexadecimal notation).

Figure 12:
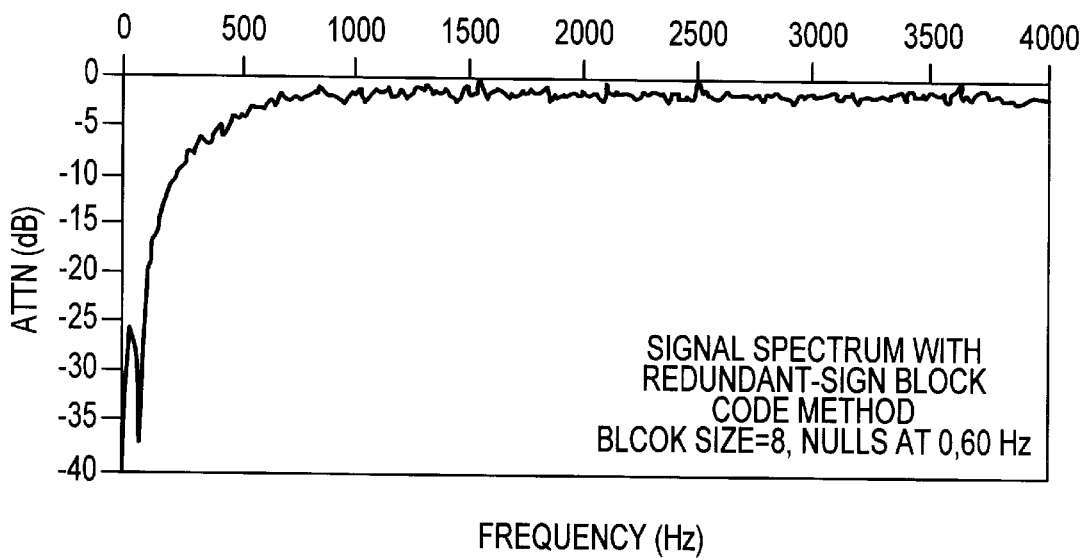
FIGS. 12 and 13 illustrate the signal spectrum for the block size of 8, inserting nulls at 0, 60 Hz and 0, 6, 12, 18, . . . , 60 Hz, respectively.
Figure 13:
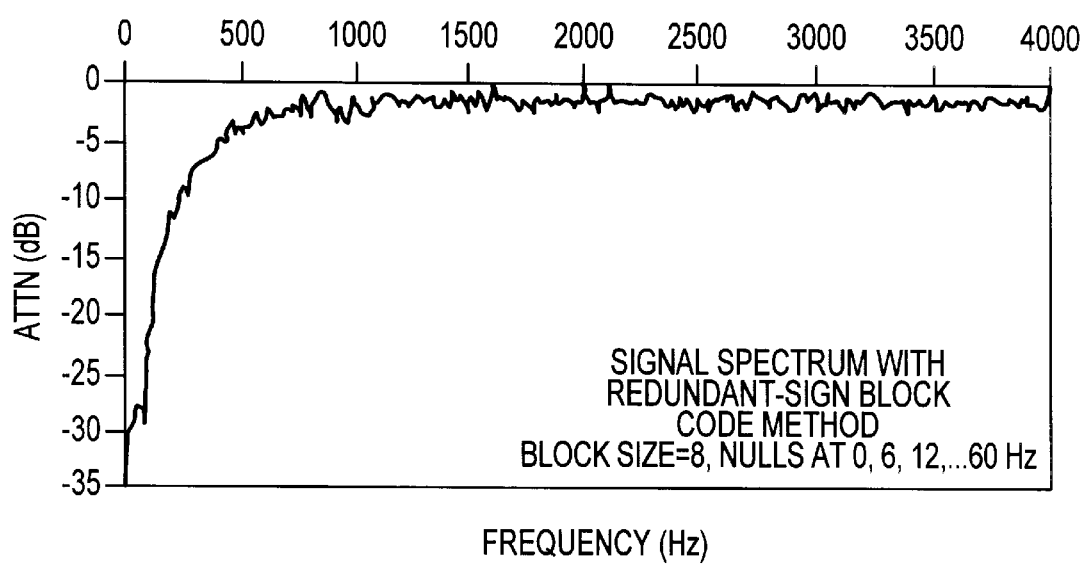

Table 1 FIGS. 12 and 13 show the signal spectrum for a block size of 8, inserting nulls at 0, 60 Hz and 0, 6, 12, 18, ..., 60 Hz, respectively. If more attenuation is desired, the block size can be increased to 16 or even higher, although the computational complexity will grow considerably. The redundancy may also be increased. For a redundancy of 1/8, all sign-bits are available for manipulation. This will increase the low-frequency attenuation over that shown in FIGS. 9 and 10 by more than 10 dB.

In addition, it may be desirable to implement a "look-ahead approach,"—that is, to consider one or more future blocks when computing the objective function for the current block of data. More specifically, the spectral metric may be computed for the current data frame (i.e., block) as well as ld future data frames, wherein ld is referred to as the "look-ahead depth". Redundant signs and/or samples that minimize the spectral metric may then be chosen in accordance with this metric. In an exemplary embodiment, look-ahead-depth is preferably an integer between 0 and 3, inclusive, which is transmitted to the transmitter by the receiver during a start-up or renegotiation procedure.

It may also be desirable to partition a data frame or block of samples into one or more spectral shaping frames and then select sign-combination subsets for each of these spectral shaping frames in order to optimize the objective function. For example, in the case where six samples are specified per data frame, the data frame may be partitioned into one, two, or three spectral shaping frames, corresponding to six, three, and two samples per spectral shaping frames. This scheme is appropriate in the look-ahead context, where at least one spectral shaping frame is used to calculate unwanted signal components—e.g., by considering the current spectral shaping frame and a predetermined number of future spectral shaping frames as determined by the look-ahead-depth.

E. Spectral Precodiny According to a Specified Spectral Shape

The foregoing methods can be further generalized to shape a transmitted sequence spectrum with respect to a specified spectral characteristic. Let the z-transform of the desired spectral shaping function be G(z) and its inverse be defined as:

$$F(z) = 1/G(z) = \sum_{m=-\infty}^{\infty} f_m z^{-m},$$

where the filter coefficient, $f_m$, can be complex-valued.

In practice, we might be only interested in the cases where F(z) is causal, i.e., $f_m=0$, for all m<0, or we may use a delayed and windowed version of F(z). In addition, we might prefer F(z) to be minimum phase. This can be done by selecting an all-pass filter A(z), such that F(z) is minimum phase and $$F(z) = \frac{A(z)}{G(z)},$$

where $|F(e^{-j\omega})|=1/|G(e^{-j\omega})|$, and F(z) is assumed to be causal and stable. Once we have obtained the desired filter coefficients $\{f_m\}$, the unwanted signal component contained in the available sequence $\{x_m\}$ for $0 \leq m \leq n$ at epoch n can be written as:

$$c_n = \sum_{m=0}^{n} x_m f_{n-m}.$$

Its energy can be reduced or completely canceled by jointly optimizing several redundant samples which will be selected with respect to the dominant weights of $f_m$ or jointly selecting several redundant signs. These two methods are similar to the aforementioned block coding with redundant samples and block coding with redundant signs.

The only difference is in the performance measure. To state clearly, we define the set of L dominant tap indices of $f_m$ as $\Im$. Then for each block of N samples, where suppose N>max$\{\Im\}$, we select L redundant samples $x_{n-l}$, $\forall l \in \Im$ subject to saturation and quantization constraints of PCM signaling or select L redundant signs $s_{n-l}$, $\forall l \in \Im$ such that $|c_n|^2$ is minimized. The search of the optimal redundant samples or signs is straightforward. Any of the constrained linear programming algorithms would be sufficient, as can be appreciated by those skilled in the art.

For illustration purposes, we consider a special case where the most dominant tap is $f_0$. Further, we assume $f_0$ is real-valued without loss of generality. For this case, it is reasonable to modify the current sample $x_n$ according to $c_{n-1}$ to minimize $|c_n|^2$. The parameter $c_{n-1}$ here is referred to as a running filter sum (RFS) at time n−1. If the "redundant-sample" method is employed for each block of N samples, then the desired sequence can be constructed as $$x_n = \begin{cases} M(d_n) & \text{if } n \neq rL \\ Q(-c_{n-1}/f_0) & \text{if } n = rL \end{cases}.$$

If the "redundant-sign" method is used, then the desired sequence is given as $$x_n = \begin{cases} M(d_n) & \text{if } n \neq rL \\ sgn(-c_{n-1}/f_0)M'(d_n) & \text{if } n = rL \end{cases},$$

where $M'(d_n)=|M(d_n)|$. It can be shown that as long as the RFS is bounded, the constructed sequence satisfies the specified spectral requirements. Note that if we choose $G(z)=1-z^{-1}$, then $f_m=1$ for all $m \geq 0$. The RFS then reduces to running digital sum, or RDS. If we choose $G(z)=1-e^{-j\omega z^{-1}}$, then $f_m=e^{-j\omega m}$ for all $m \geq 0$ and a given normalized frequency $\omega$. The RFS reduces to RFT.

To demonstrate the effectiveness of the various methods in accordance with the present invention, we consider $G(z)= 1-z^{-2}$, a so-called modified duo-binary signal. This class of sequences does not possess a sharp discontinuity at the Nyquist frequency and, as a result, can be easily approximated by a physically realizable filter. It can be shown that the corresponding inverse filter is given as, $$F(z) = \sum_{m=0}^{\infty} z^{-2m},$$

where we select (ROC) $|z|<1$.

Accordingly, we can use two separate RDSs to account for the even samples and the odd samples respectively, $$c_n = \begin{cases} \sum_{m=0}^{n/2} x_{2m} & \text{if } n \text{ is even} \\ \sum_{m=0}^{(n-1)/2} x_{2m+1} & \text{if } n \text{ is odd} \end{cases}.$$

The sequence $\{x_n\}$ can be constructed by any of the aforementioned methods.

Figure 14:
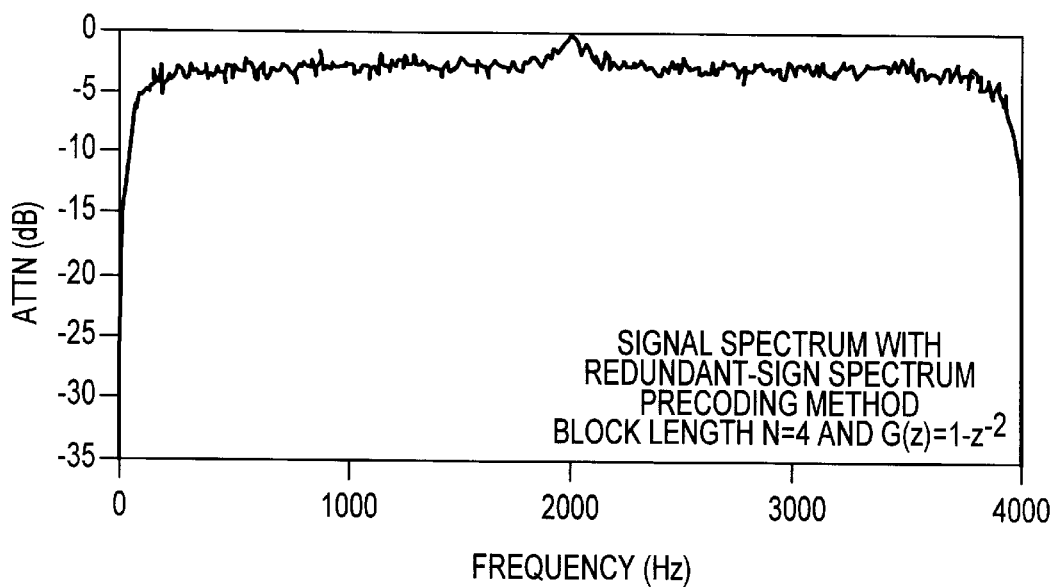
FIG. 14 illustrates the signal spectrum of the sequence constructed by the redundant-sign method for a block length of N=4 with a redundancy of 1/16.

FIG. 14 shows the power spectrum of the sequence constructed by the redundant-sign method for a block length of N=4 with a redundancy of 1/16.

Figure 15:
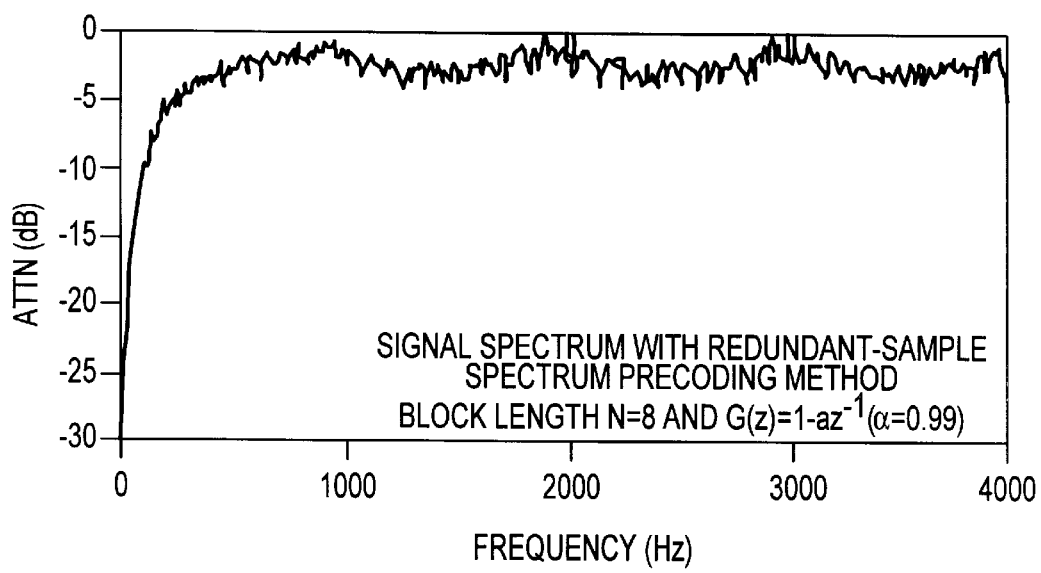
FIG. 15 illustrates the signal spectrum of the sequence constructed by the redundant-sample method.

The last example considers $G(z)=1-\alpha z^{-1}$ where the weighting factor $\alpha$, or forgetting factor, can be used to control the memory of the residual RDS at the cost of slightly lower attenuation at DC. FIG. 15 shows the power spectrum of such sequence constructed by the redundant sample method, where N=8, $\alpha$=0.99.

Alternatively, in place of the aforementioned "all poles" model, the system may employ a filter function having two zeros and two poles (i.e., a "bi-quad" filter function). More specifically, the spectral shape filter function in the digital modem may be optimized by selecting parameters of the following transfer function:

$$T(z) = \frac{(1 - a_1 z^{-1})(1 - a_2 z^{-1})}{(1 - b_1 z^{-1})(1 - b_2 z^{-1})}$$

where $a_1$, $a_2$, $b_1$ and $b_2$ are parameters having absolute values less than or equal to 1. In a preferred embodiment, these parameters, $a_1$, $a_2$, $b_1$ and $b_2$, are determined by the analog modem, then transmitted to the digital modem during a startup sequence, along with details related to the redundancy level. The digital modem may then perform the spectral shaping according to the running filter sum (RFS) characterized by the filter:

$$F(z) = \frac{1}{T(z)} = \frac{(1 - b_1 z^{-1})(1 - b_2 z^{-1})}{(1 - a_1 z^{-1})(1 - a_2 z^{-1})}$$

The objective function based on the RFS can be computed by a three-step process. First, assuming x[n] is the digital modem's input data sequence (i.e., a signed signal proportional to the linear value corresponding to the PCM codes being transmitted), we can compute:

$$y[n]=x[n]-b_1x[n-1]+a_1y[n-1], \text{ and}$$

$$v[n]=y[n]-b_2y[n-1]+a_2v[n-1].$$

Next, the final value can be computed as:

$$w[n]=v^2[n]+w[n-1].$$

F. Selection of Redundancy

In most of the examples described above, a redundancy of 1/16 samples for the redundant sample method or 1/2 bit for the redundant sign method has been assumed. Generally, a higher level of redundancy will allow greater control over the transmit spectrum, but at the cost of constellation expansion which may significantly decrease the minimum distance between signal points. In some cases it may therefore be appropriate to vary the redundancy according to channel conditions. Given the non-uniform quantization levels of $\mu$-law and A-law CODECs, the constellation expansion required for the above redundancy can become quite costly, resulting in as much as a 12 dB reduction in minimum distance between signal points. In many cases, the benefit of the spectrum control will be much less. By selecting the redundancy based on channel conditions and/or data rate, significant improvements in performance may be achieved.

For example, a transmission system with multiple data rates may fix the redundancy at a low level for high data rates, and at a higher level for lower data rates. Thus, at high rates, which could only be achieved on good channels, where generally less spectral optimization is needed, the redundancy could be as low as 1/16 bits (1 bit every 16 samples) using a redundant-sign algorithm, or even be completely omitted. At lower rates, the redundancy could be increased to 1/8 and then 1/4 and 1/2 bits at the lowest rates.

Another example is a transmission system where characteristics of the channel could be measured, and the redundancy selected based on the measurements. For instance, if high amounts of nonlinear transformer-hybrid distortion are detected, the redundancy would be increased to allow the spectrum control system to reduce transmitted energy at low frequencies to avoid much of the distortion. If additive tonal interference is detected, such as 50 or 60 Hz tones and harmonics thereof, the redundancy could be increased to allow for near-nulls in the transmit spectrum at the interfering frequencies.

Further, if the channel's frequency response is measured such that receiver equalization can be expected to introduce noise enhancement, redundancy can be increased as required to allow optimum pre-emphasis as discussed, for example, in E. Lee and D. Messerschmitt, "Digital Communication," Kluwer Academic Publishers, 1994, or B. P. Lathi, "Modern Digital Communication Systems," Section 6.5, Holt Rinehart and Winston, Inc., 1989. In this way, the trade-off between redundancy and spectral shaping can be optimized to achieve the highest possible data signaling rate.

It will be appreciated that the actual selection of redundancy as detailed in this section may be determined by either the receiver or transmitter, depending on the context. For example, it is advantageous for the receiver to determine the redundancy values in accordance with line conditions, then transmit these parameters to the digital modem during a start-up or rate-renegotiation process.

It will be recognized that the cost functions presented above can be used for a variety of mapping methods. Likewise, various mapping schemes may be modified to improve their performance with respect to the mapping algorithm. One method of spectral shaping for PCM modems is to use a set of L non-uniformly spaced signal points, labeled x(0),x(1), . . . ,x(L−1), which are divided in two subsets, those for which the index is in the range L−N to N−1 and those for which the index is outside that range. From a set of input bits, a mapping index n in the range of 0 to N−1 is first calculated. If n≧L−N, signal point n is transmitted. If n<L−N, either signal point x(n) or x(n+N) is transmitted based on a modified RDS. However, using this method in shell mapping, for example, similar to that in the well-known V.34 standard, the ring index selected in the shell mapping may be modified, which would violate the necessary assumptions made in the shell mapping algorithm.

An alternative scheme according to the present invention, provides for the selection of either signal point x(n) or x(L−1−n), depending on either a simple RDS or one of the cost functions according to embodiments of the invention, presented above. Since x(n)=−x(L−1−n), there is no modification to the ring index, and the assumptions made in the shell mapping algorithm would still hold. Hence, it can be understood that the present system for spectrum control and shaping is transparent to shell mapping, for example, among other mapping schemes.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of spectrally shaping transmitted samples with a set of predetermined frequency characteristics and a predetermined set of allowable transmitted signal levels, wherein a transmitted sample is either of an unmodified source sample or a dependent sample, the transmitted samples being transmitted in data frames, said method comprising the steps of:
   (a) calculating, for each of the transmitted samples, a Running Filter Sum of unwanted components up to the current sample, wherein said Running Filter Sum is based on a biquad filter;
   (b) computing an objective function in accordance with the Running Filter Sum obtained in Step (a);
   (c) selecting, for each data frame of transmitted samples, at least one redundant sample to be added or modified within the data frame such that the objective function of Step (b) is optimized.

2. The method of claim 1, wherein said step of selecting comprises selecting redundant signs to optimize the objective function.

3. The method of claim 1, wherein the transmitted samples are transmitted via a communication channel, and wherein said method further comprises the step of varying the number of redundant signs in accordance with communication channel conditions.

4. The method of claim 1, wherein the transmitted samples are transmitted at a transmit data rate, and wherein said method further comprises the step of varying the number of redundant signs in accordance with the transmit data rate.

5. The method of claim 4, wherein said varying step comprises varying the number of redundant signs such that the redundancy is lowest at a high transmit data rate and highest at a low transmit data rate.

6. The method of claim 1, wherein the transmitted samples are transmitted to a receiver via a communication channel, and wherein the number of redundant signs is determined by the receiver and sent to the transmitter during a start-up sequence.

7. The method of claim 1, wherein the transmitted samples are transmitted to a receiver via a communication channel, and wherein the number of redundant signs is determined by the receiver and sent to the transmitter during a rate renegotiation sequence.

8. A method of spectrally shaping source samples to transmitted samples based on a set of predetermined characteristics of a frequency spectrum, wherein the allowable signal levels of the transmitted samples are limited to a prescribed set, and wherein the source samples are partitioned into data frames, said method comprising the steps of:
   (a) calculating, for a current data frame and a predetermined number of additional data frames, a Running Filter Sum of unwanted signal levels, wherein said Running Filter Sum is based on a biquad filter;
   (b) computing an objective function in accordance with the Running Filter Sum obtained in Step (a); and
   (c) selecting, for the current data frame of source samples, at least one redundant sign for optimization of the objective function computed in Step (b).

9. The method of claim 8, wherein said predetermined number of additional data frames comprises ld look-ahead frames, wherein ld is an integer between zero and three inclusive.

10. The method of claim 8, wherein the transmitted samples are transmitted via a communication channel, and wherein said method further comprises the step of varying the number of redundant signs in accordance with communication channel conditions.

11. The method of claim 8, wherein the transmitted samples are transmitted at a transmit data rate, and wherein said method further comprises the step of varying the number of redundant signs in accordance with the transmit data rate.

12. The method of claim 11, wherein said varying step comprises varying the number of redundant signs such that the redundancy is lowest at a high transmit data rate and highest at a low transmit data rate.

13. The method of claim 8, wherein the samples are transmitted by a transmitter to a receiver via a communication channel, and wherein the number of redundant signs is determined by the receiver and sent to the transmitter during a training sequence.

14. The method of claim 8, wherein the samples are transmitted by a transmitter to a receiver via a communication channel, and wherein the number of redundant signs is determined by the receiver and sent to the transmitter during a rate-renegotiation sequence.

15. The method of claim 8, wherein the objective function is computed based upon the sum of the squares of the output of the Running Filter Sum obtained in Step (a).

16. The method of claim 8, wherein the objective function is characterized by a filter function, F(z), given by:

$$F(z) = \frac{1}{T(z)} = \frac{(1-b_1z^{-1})(1-b_2z^{-1})}{(1-a_1z^{-1})(1-a_2z^{-1})},$$

wherein:

T(z) is the spectral shape filter transfer function; and
$a_1$, $a_2$, $b_1$, and $b_2$ are filter parameters having absolute values less than or equal to 1.

17. The method of claim 16, wherein the nth sample has a value x(n), and wherein the step of computing the objective function comprises the steps of:

(a) computing a value, y(n), for the nth sample, as:

$$y(n)=x(n)-b_1x(n-1)+a_1y(n-1);$$

(b) computing a value, v(n), for the nth sample, as:

$$v(n)=y(n)-b_2y(n-1)+a_2v(n-1);$$

(b) computing the objective function, w(n), as:

$$w(n)=v^2(n)+w(n-1).$$

18. The method of claim 16, wherein a transmitter is used to transmit the samples to a receiver, and wherein the filter parameters $a_1$, $a_2$, $b_1$, and $b_2$ are determined by the receiver and sent to the transmitter during a start-up sequence.

19. The method of claim 16, wherein a transmitter is used to transmit the samples to a receiver, and wherein the filter parameters $a_1$, $a_2$, $b_1$, and $b_2$ are determined by the receiver and sent to the transmitter during a rate-renegotiation sequence.

20. A system for controlling and shaping transmitted data samples having predetermined frequency characteristics and allowable transmit signal levels, wherein the transmitted samples are partitioned into data frames, said system comprising:

a microprocessor configured to:
(a) calculate, for a current data frame and a predetermined number of additional data frames, a Running Filter Sum to obtain a measure of unwanted signal components of source samples up to at least the current block, wherein said Running Filter Sum is based on a biquad filter;
(b) compute an objective function based on the Running Filter Sum;
(c) select, for the current data frame of source samples, at least one redundant sign to optimize the objective function; and a semiconductor memory device for storing and enabling the microprocessor to access the Running Filter Sum, the objective function, and the redundant sample.

21. The system of claim 20, wherein:
the microprocessor is further configured to transmit the samples to a receiver over a communication channel; and
the biquad filter is characterized by a set of filter parameters chosen in accordance with the communication channel conditions.

22. The system of claim 21, wherein the microprocessor is further configured to receive filter parameters sent by the receiver during a start-up sequence.

23. The system of claim 21, wherein the microprocessor is further configured to receive filter parameters sent by the receiver during a rate-renegotiation sequence.

24. The system of claim 21, wherein the microprocessor is further configured to receive, during a start-up sequence, the number of redundant signs.

25. The system of claim 21, wherein the microprocessor is further configured to receive, during a rate-renegotiation sequence, the number of redundant signs.

26. A method of spectrally shaping transmitted samples with a set of predetermined frequency characteristics and a predetermined set of allowable transmitted signal levels, wherein each of said transmitted samples comprises an amplitude and a sign, and wherein said transmitted samples are transmitted in data frames corresponding to groups of input data bits, and wherein each of said data frames is divided into at least one spectral shaping frame, said method comprising the steps of:

(a) partitioning each of said groups of input data bits into:
a first subgroup used to select the amplitudes of said transmitted samples in said data frame; and
a second subgroup used to select a sign-combination subset for each of said spectral shaping frames in said data frame, wherein said sign-combination subsets comprise sign combinations which differ from each other by more than one sign bit;

(b) calculating, for each of said transmitted samples, a Running Filter Sum of unwanted components up to at least the current spectral shaping frame for at least two of said sign combinations in said sign-combination subset, wherein said Running Filter Sum is based on a biquad filter;

(c) computing an objective function in accordance with said Running Filter Sum obtained in step (b);

(d) selecting, for each of said spectral shaping frames of transmitted samples, a sign combination from said sign-combination subset such that said objective function of step (c) is optimized.

27. The method of claim 26, wherein each of said sign-combination subsets comprises two sign combinations.

28. The method of claim 26, wherein said data frame comprises six transmitted samples, and wherein each of said spectral shaping frames comprises 2, 3, or 6 transmitted samples.

29. The method of claim 26, wherein said sign combinations in said sign-combination subsets are chosen so as to maximize the Hamming distance between sign combinations in the subsets, considering the signs as 0's and 1's of a binary codeword.

30. The method of claim 26, wherein said transmitted samples are transmitted via a communication channel, further comprising the step of varying a level of redundancy used for spectral shaping in accordance with communication channel conditions.

31. The method of claim 26, wherein said transmitted samples are transmitted at a transmit data rate, further comprising the step of varying a level of redundancy used for spectral shaping in accordance with the transmit data rate.

32. The method of claim 31, wherein said step of varying is performed such that said redundancy is lowest at a high transmit data rate and highest at a low transmit data rate.

33. The method of claim 26, wherein said transmitted samples are transmitted to a receiver by a transmitter via a communication channel, and wherein a level of redundancy used for spectral shaping is determined by said receiver and sent to said transmitter during a start-up sequence.

34. The method of claim 26, wherein said transmitted samples are transmitted to a receiver by a transmitter via a communication channel, and wherein a level of redundancy used for spectral shaping is determined by said receiver and sent to said transmitter during a rate renegotiation sequence.

35. The method of claim 26, wherein said transmitted samples are transmitted to a receiver by a transmitter via a communication channel, and wherein said biquad filter is characterized by a set of filter parameters determined by said receiver and sent to said transmitter during a start-up sequence.

36. The method of claim 26, wherein said transmitted samples are transmitted to a receiver by a transmitter via a communication channel, and wherein said biquad filter is characterized by a set of filter parameters determined by said receiver and sent to said transmitter during a rate-renegotiation sequence.

* * * * *